United States Patent
Nakazawa et al.

Patent Number: 5,619,422
Date of Patent: Apr. 8, 1997

[54] ROTOR TEMPERATURE CONTROL SYSTEM

[75] Inventors: Takashi Nakazawa; Shinji Azuma; Norihisa Sagawa, all of Katsuta, Japan

[73] Assignee: Hitachi Koki Company Limited, Tokyo, Japan

[21] Appl. No.: 168,311

[22] Filed: Dec. 17, 1993

[30] Foreign Application Priority Data

Dec. 18, 1992 [JP] Japan .................................. 4-338650

[51] Int. Cl.$^6$ ...................................................... G06F 17/00
[52] U.S. Cl. ............................................. 364/505; 318/471
[58] Field of Search ................................. 364/505, 477, 364/476; 62/3.2, 3.3; 165/185; 318/471, 472, 473; 361/25, 26, 27

[56] References Cited

U.S. PATENT DOCUMENTS

| | | | |
|---|---|---|---|
| 4,845,341 | 7/1989 | Rae | 340/589 X |
| 4,849,677 | 7/1989 | Krüger | 318/473 |
| 4,939,437 | 7/1990 | Farag et al. | 318/473 |
| 5,002,226 | 3/1991 | Nelson | 236/78 R |
| 5,397,515 | 3/1995 | Searle et al. | 264/40.6 |

FOREIGN PATENT DOCUMENTS

| | | |
|---|---|---|
| 3630483 | 6/1987 | Germany . |
| 3632087 | 7/1987 | Germany . |
| 2073455 | 10/1981 | United Kingdom . |
| 2150717 | 7/1985 | United Kingdom . |
| 2162972 | 2/1986 | United Kingdom . |
| 8809220 | 12/1988 | WIPO . |

*Primary Examiner*—Emanuel T. Voeltz
*Assistant Examiner*—Kamini Shah
*Attorney, Agent, or Firm*—Lowe, Price, LeBlanc & Becker

[57] ABSTRACT

A rotor temperature control system for a centrifuge is provided. This system includes an ambient temperature sensor for detecting ambient temperature around the system, a temperature regulating device for regulating temperature of a rotor of the centrifuge according to an operation factor which is variable within a range of preselected maximum to minimum values, and an operation factor controller for controlling a value the operation factor of the temperature regulating device in a preselected relation to the ambient temperature and a given target rotor temperature to modify the temperature of the rotor to the target rotor temperature. With this arrangement, the temperature of the rotor is modified to a desired value quickly regardless of an initial temperature of the rotor.

9 Claims, 8 Drawing Sheets

ROTOR TEMPERATURE CONTROL SYSTEM

BACKGROUND OF THE INVENTION

1. Technical Field of the Invention

The present invention relates generally to a rotor temperature control system for use in centrifuges. More particularly, the invention relates to a rotor temperature control system which is operable to modify an operation factor of a temperature regulating device based on an ambient temperature to control the temperature of a rotor in which samples to be separated are disposed to a target rotor temperature.

2. Background Art

There is known an ON-OFF rotor temperature control system utilizing an instant temperature value of a rotor of a centrifuge. This temperature control system, as shown in FIG. 8, modifies an operation factor of a temperature regulating device to 100% when the temperature of the rotor is higher than a target level by an error E, while when the rotor temperature is lower than the target level, the operation factor is set to 0%.

This conventional system, however, raises a drawback in that due to a control time lag occurring between temperature detection of the rotor and temperature regulation of the rotor, a ripple of the rotor temperature, as shown in FIG. 9, becomes relatively great under the control.

For avoiding the above problem, a proportional control (P control), as shown in FIG. 10, has been proposed in the art which changes an operation factor of a temperature regulating device in proportion to an error E developing between an actual rotor temperature and a target rotor temperature. However, the proportional control also suffers from the following drawback. The moment the error E is reduced to zero, the operation factor is also set to zero. With the lapse of time, however, the rotor temperature rises above the target rotor temperature to produce a small error again since the target rotor temperature is usually set to a value lower than ambient temperatures and the temperature regulating device is warmed by the ambient air. Upon development of this error, the operation factor is increased again (e.g., several percentages D), however, the activities of elevating the rotor temperature and restricting same are balanced with each other, ultimately producing an error e.

For eliminating the error e, the so-called PI control using integral action (I action) along with the P control is known. The integral action is such that the error e is added in time-sequence to derive a correction value to correct the operation factor based thereon. As shown in FIG. 12, according to the PI control, an operation factor D corrected based on an integration value of the error e is provided to regulate the temperature of the rotor to a target rotor temperature.

The above PI control, however, gives rise to a problem in that a response rate relative to variation in rotor temperature becomes low due to the time-sequential integration of the error e produced. In order to improve this response rate, the technique, referred to as PID control, using differential control (D control) in addition to the PI control has been proposed in the art. In this differential control, the operation factor is further corrected based a variation (differential value) in rotor temperature.

In the above discussed conventional rotor temperature control systems, the operation factor of the temperature regulating device is changed in proportion to the error E between the actual rotor temperature and the target rotor temperature. Thus, in the case where at the start of operation of a centrifugal unit, a great temperature difference, or error is developed between the rotor temperature and the target rotor temperature, the operation factor of the temperature regulating device is set to a greater value so that the rotor temperature reaches the target rotor temperature quickly. However, when the rotor temperature initially falls in a range in the vicinity of the target rotor temperature so that the error E is small, the operation factor of the temperature regulating device is set to a smaller value, undesirably requiring relatively long period of time for the rotor temperature to reach the target rotor temperature. In other words, a drawback in encountered in that the operation factor of the temperature regulating device is greatly dependent upon the degree of the temperature error between the rotor temperature and the target rotor temperature.

Additionally, in common use of centrifuges, for accurate separation in a short period of time or preventing samples in a rotor from being damaged, it is often the case that the rotor is initially cooled to a temperature close to a target rotor temperature prior to separation operation. In this case, likewise to the above, a great deal of time is required for the rotor to reach the target rotor temperature.

SUMMARY OF THE INVENTION

It is therefore a principal object of the present invention to avoid the disadvantages of the prior art.

It is another object of the present invention to provide a rotor temperature control system for centrifuges which is operable to modify the temperature of a rotor to a desired value quickly and smoothly regardless of an initial temperature of the rotor.

According to one aspect of the present invention, there is provided a rotor temperature control system for a centrifuge which comprises an ambient temperature determining means for determining ambient temperature around the system to provide a signal indicative thereof, a temperature regulating means for regulating temperature of a rotor of the centrifuge according to an operation factor variable within a range of preselected maximum to minimum values, and a controlling means, responsive to the signal from the ambient temperature determining means, for controlling the operation factor of the temperature regulating means in a preselected relation to the ambient temperature and a given target rotor temperature to modify the temperature of the rotor to the target rotor temperature.

In the preferred mode, a rotor temperature determining means is further provided which determines the temperature of the rotor and provides a signal indicative thereof. The controlling means operates the temperature regulating means at the operation factor determined in the preselected relation to the ambient temperature and the given target rotor temperature while monitoring a difference between the rotor temperature determined by the rotor temperature determining means and the target rotor temperature.

The controlling means may correct the operation factor of the temperature regulating means determined in the preselected relation to the ambient temperature and the given target rotor temperature according to a correction value which is derived based on a difference between the rotor temperature determined by the rotor temperature determining means and the target rotor temperature.

The temperature regulating means includes a heat radiating/absorbing means surrounding the rotor and a heat-exchanging means operable to transfer heat between ambient air and the heat radiating/absorbing means. The ambient temperature determining means monitors the temperature of the heat-exchanging means to determine the ambient temperature.

The rotor temperature determining means includes a radiating temperature sensor which detects radiation heat produced from the rotor. The controlling means determines the rotor temperature based on the radiation heat from the rotor and the ambient temperature determined by the ambient temperature determining means.

According to another aspect of the present invention, there is provided a rotor temperature controlling method for controlling temperature of a rotor of a centrifuge which comprises the steps of: determining ambient temperature around temperature regulating means for regulating temperature of the rotor according to an operation factor variable within a range of preselected maximum to minimum values; determining a value of the operation factor of the temperature regulating means in a preselected relation to the ambient temperature and a given target rotor temperature; and providing a control signal to the temperature regulating means to operate the temperature regulating means at the operation factor determined in the operation factor determining step for modifying the temperature of the rotor to the target rotor temperature.

In the preferred mode, the rotor temperature controlling method further comprises the steps of determining temperature of the rotor and correcting the operation factor of the temperature regulating means determined in the preselected relation to the ambient temperature and the given target rotor temperature according to a correction value which is based on a difference between the rotor temperature determined by the rotor temperature determining means and the target rotor temperature.

The temperature regulating means includes a heat radiating/absorbing means surrounding the rotor and a heat-exchanging means operable to transfer heat between ambient air ad the heat radiating/absorbing means. In the ambient temperature determining step, the temperature of the heat-exchanging means is monitored to determine the ambient temperature.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
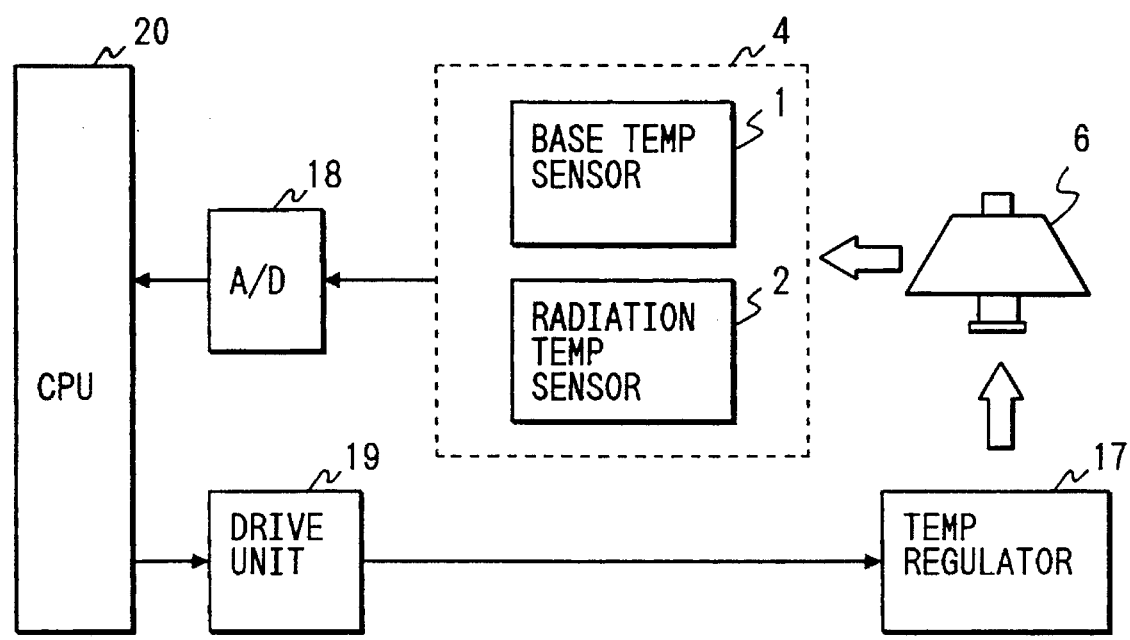
FIG. 1 is a block diagram which shows a rotor temperature control system according to the present invention.

Referring now to the drawings, particularly to FIG. 1, there is shown a rotor temperature control system for a centrifuge according to the present invention. The rotor temperature control system includes generally a rotor temperature detector 4, an A/D converter 18, a CPU 20, a drive unit 19, and a rotor temperature regulating assembly 17. The CPU 20 controls an operation factor of the rotor temperature regulating assembly 17 through the drive unit 19 based on a detection signal output from the rotor temperature detector 4 through the A/D converter.

Figure 2:
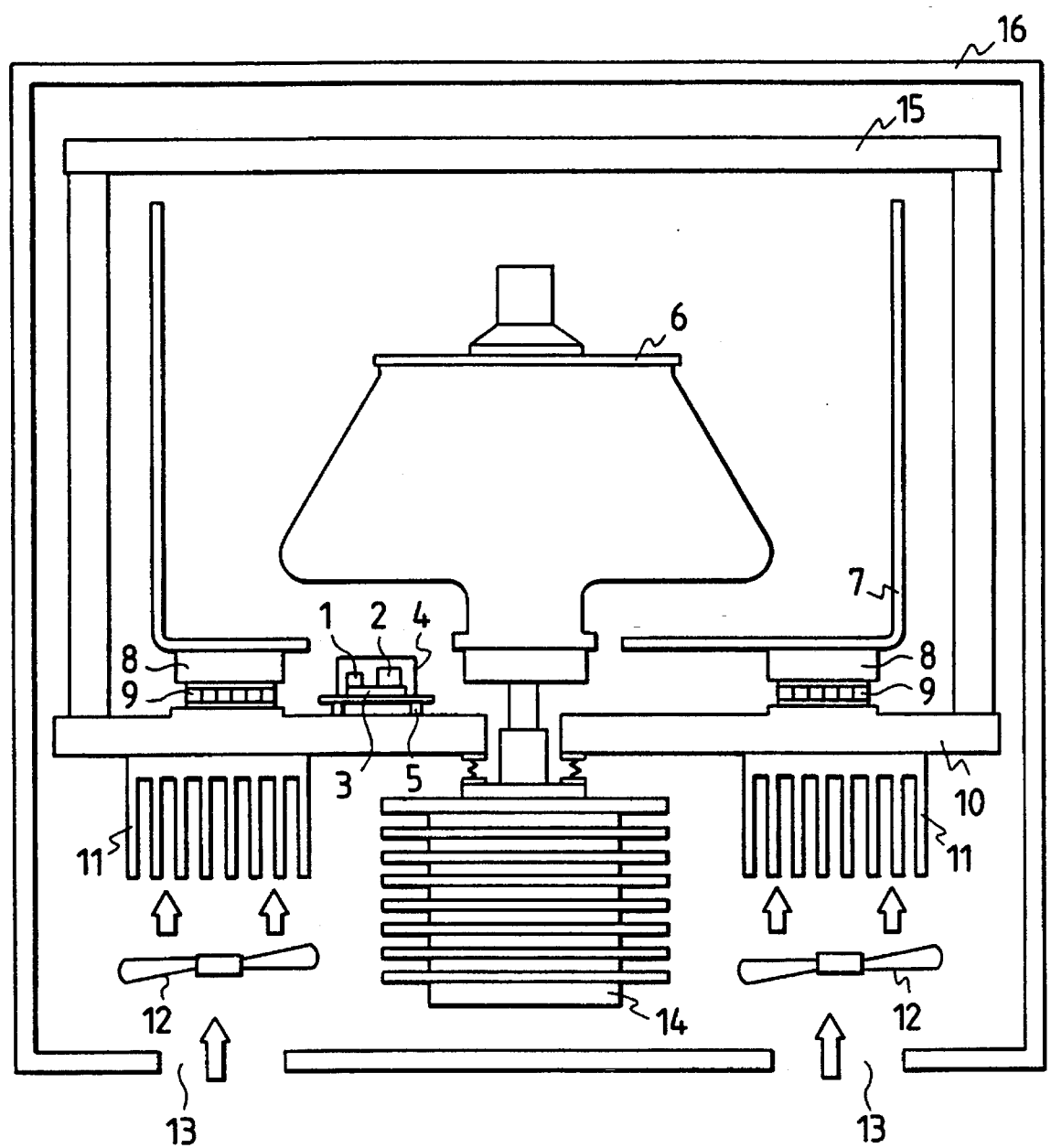
FIG. 2 is a cross-sectional view which shows a temperature regulating assembly for regulating the temperature of a rotor of a centrifuge.

Referring to FIG. 2, the rotor temperature regulating assembly 17 is shown.

The rotor temperature regulating assembly 17 includes a housing 16, a vacuum chamber 15, a bowl 7 surrounding the rotor 6, distance pieces or spacers 8 attached to the bowl 7, a radiating fin plate 10, thermoelectric cooling/heating elements 9 interposed between the spacers 8 and the radiating fin plate 10, respectively, radiating fins 11, and cooling fan 12 for cooling the radiating fins 11.

Each of the thermoelectric cooling/heating elements 9 manifests properties which absorb heat of a quantity, according to a current applied thereto, through its surface and radiate the absorbed heat from the other surface.

The rotor 6 in which samples are disposed is driven by a motor 14 at high speeds so that the samples are separated under centrifugal forces. During the centrifugal operation, the vacuum chamber 15 is maintained at high vacuum levels by a vacuum pump (not shown).

The rotor temperature detector 4, as shown, includes a base temperature sensor 1, a radiation temperature sensor 2, a base plate 3, and a spacer 5. The base temperature sensor 1 is directly mounted on the base plate 3 to measure temperature thereof. The radiation temperature sensor 2 is so arranged on the base plate 3 as to be oriented toward the rotor 6 so that it receives radiation heat produced from the rotor 6 to determine a temperature difference between the rotor 6 and the base plate 3. The CPU 20 is responsive to sensor signals output from the base temperature sensor 1 and the radiation temperature sensor 2 through the A/D converter 18 to determine a rotor temperature based on the sum of the temperature difference determined by the radiation temperature sensor 2 and the base plate temperature measured by the base temperature sensor 1.

In operation, when the rotor 6 is cooled to a desired value under rotor temperature control, the thermoelectric cooling/heating elements 9 are responsive to the control signal from the CPU 20 to absorb heat through their upper surfaces so that the spacers 8 and the bowl 7 are cooled, the radiation cooling thereby taking place to decrease the temperature of the rotor 6. At this time, the thermoelectric cooling/heating elements 9 produce heat from their lower surfaces, which is, in turn, cooled through the radiating fins 11 and the radiating fin plate 10 by fresh air introduced through inlet ports 13 by the fans 12 so that the heat is transferred outside the housing 16 through an outlet port (not shown). In this manner, the rotor 6 is heat-exchanged through the bowl 7, the spacers 8, the thermoelectric cooling/heating elements 9, the radiating fin plate 10, and the radiating fins 11 with the outside air without internal circulation of heat.

Alternatively, when heating the rotor 6, the CPU 20 provides a control signal to the thermoelectric cooling/heating elements 9 to produce a current flow in a direction opposite that when cooling the rotor 6, as mentioned above. This causes thermoelectric cooling/heating elements 9 to conduct heat away from the radiating fin plate 10 and the radiating fins 11 through the lower surfaces and to radiate the conducted heat to the spacers 8 and the bowl 7 through the upper surfaces, resulting in the rotor 8 being heated to a desired temperature.

Figure 3:
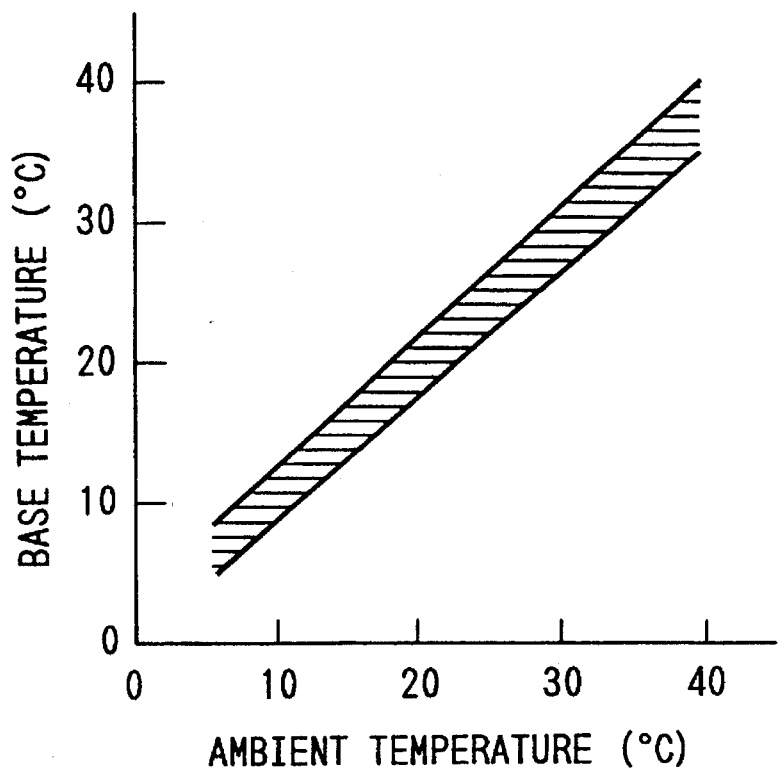
FIG. 3 is a graph which shows a relation between a base temperature and an ambient temperature.

In either case, as mentioned above, the radiating fin plate 10 and the radiating fins 11 are exposed to the outside air so that it is maintained close to an ambient temperature. It will be appreciated that the base plate temperature measured by the base temperature sensor 1 may be, as shown in FIG. 3, considered to be substantially equal to the ambient temperature.

As clear from the above, the rotor temperature control system forms a heat-exchanging flow path extending from the rotor 6 through the bowl 7, the spacers 8, the thermoelectric cooling/heating elements 9, and the radiating fins 12 to the ambient air, and vice versa. Thus, the temperature of an intermediate part of the system such as the bowl 7 may be determined based on a constant rate, dependent upon mechanical arrangements of the system, relative to the rotor temperature and the ambient temperature. The mount of heat absorption, or heat exchange of the thermoelectric cooling/heating element 9 (i.e., the operation factor of the temperature regulating assembly 17) is uniformly determined based on the rotor temperature and the ambient temperature.

Figure 4:
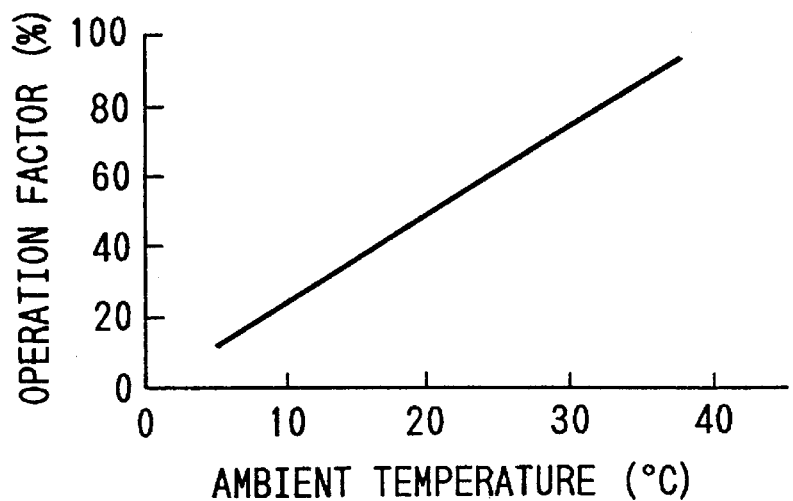
FIG. 4 is a graph which shows a relation between an operation factor and an ambient temperature.

In the rotor temperature control system of this invention, the operation factor D required for regulating the rotor temperature to a target rotor temperature Ts is, as shown in FIG. 4, determined within a range of 0% to 100% based on an ambient temperature Ta according to the following equation.

$$D = K \times (Ta - Ts)$$

where K is a coefficient, peculiar to the system, as described above, dependent upon the mechanical arrangements of the system.

The operation factor D may alternatively be determined by look-up using mapped data to select an appropriate one from among a plurality of values prestored in a memory based on the ambient temperature every initiation of operation of the system.

Figure 5:
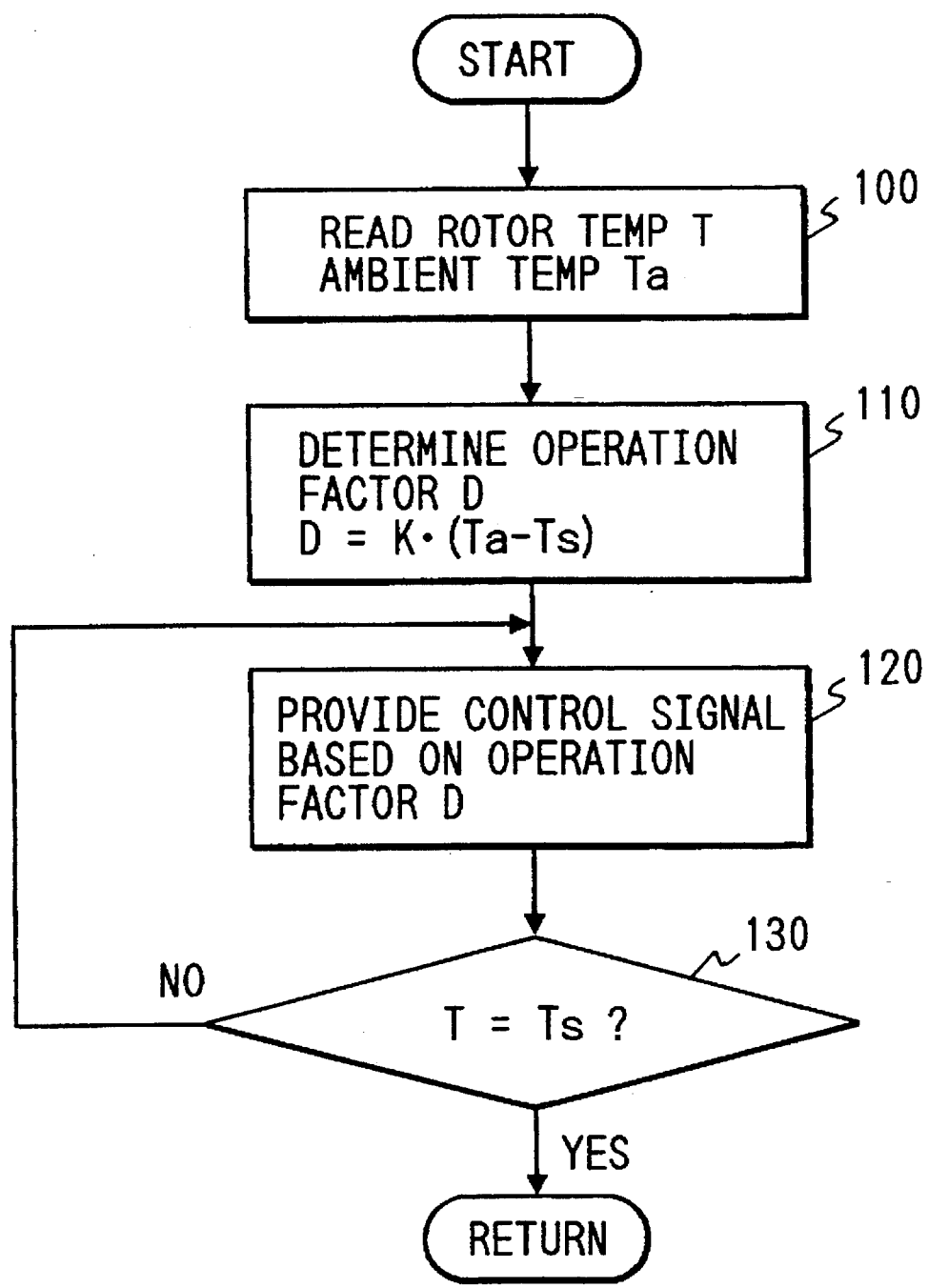
FIG. 5 is a flowchart which shows logical steps performed by a control unit of a rotor temperature control system of the invention.

Referring to FIG. 5, there is shown therein a flowchart of a program or sequence of the logical steps performed by the CPU 20.

After entering the program in response to a starting operation of the system, the routine proceeds to step 100 wherein the rotor temperature T and the ambient temperature Ta are determined based on sensor signals from the base temperature sensor 1 and the radiating temperature sensor 2.

The routine then proceeds to step 110 wherein the operation factor D is determined according to the relation of $D = K \times (Ta - Ts)$, as explained above.

Subsequently, in step 120, a control signal having a current value corresponding to the operation factor D determined in step 110 is provided to the thermoelectric cooling/heating elements 9, respectively.

The routine then proceeds to step 130 wherein it is determined whether the rotor temperature T reaches the target rotor temperature Ts or not. If a NO answer is obtained concluding that the rotor temperature T does not yet reach the target rotor temperature Ts, the routine returns back to step 120. Alternatively, if a YES answer is obtained in step 130, the routine returns back to the initial step.

Figure 6:
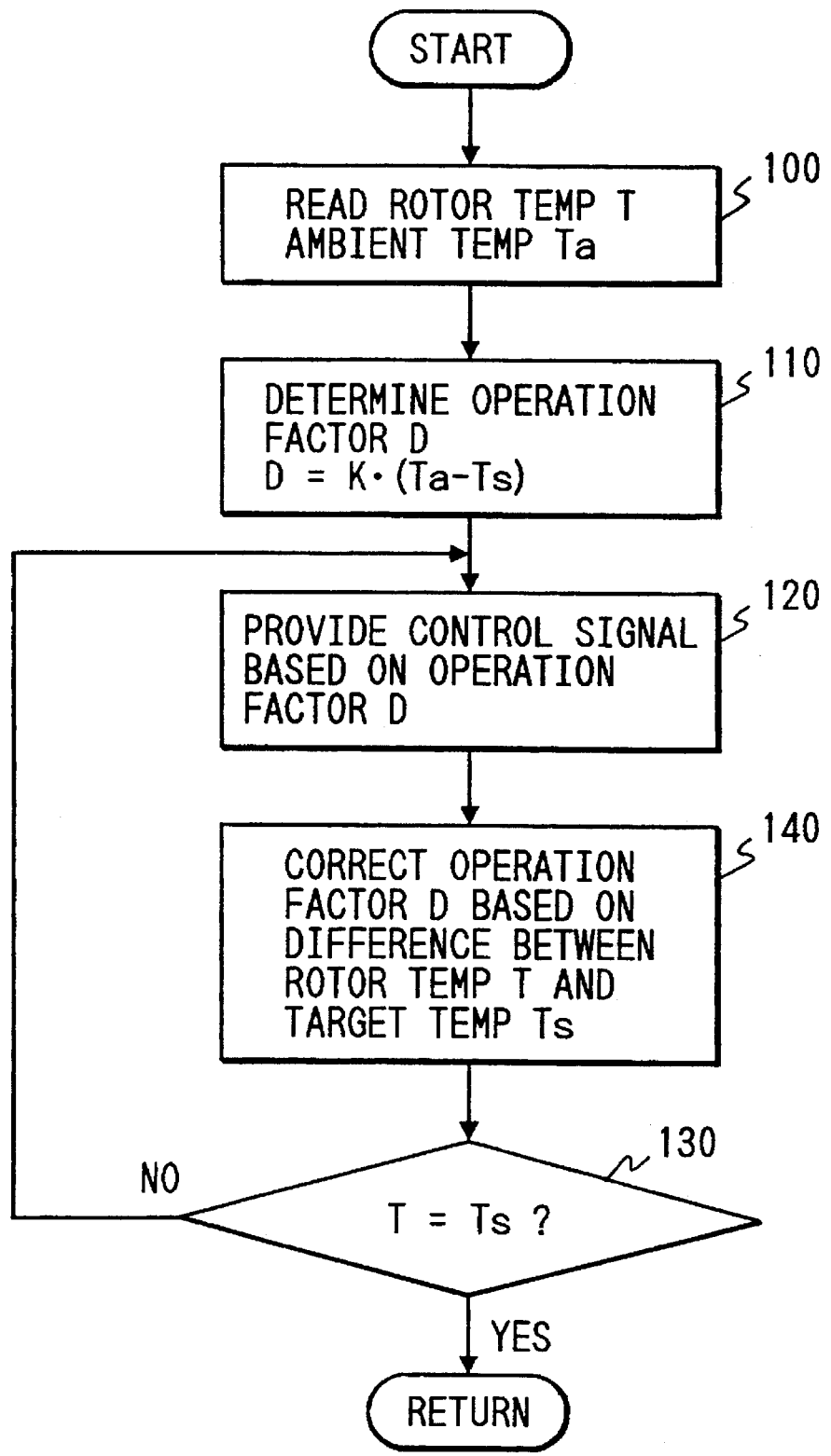
FIG. 6 a flowchart which shows an alternative embodiment of logical steps performed by a control unit of a rotor temperature control system of the invention.

FIGS. 6 shows a flowchart representing an alternate embodiment according to the invention. This embodiment is different from the one, as shown in FIG. 5, only in that step 140 is provided after step 120, and explanation of other steps will be omitted here.

In step 140, the operation factor D is corrected, under the PID control, as discussed in the introductory part of the specification, by adding a correction operation factor which is determined based on an integration value derived by adding an error in time-sequence which will develop between the rotor temperature T and the target rotor temperature Ts and a variation in the rotor temperature T.

Figure 7:
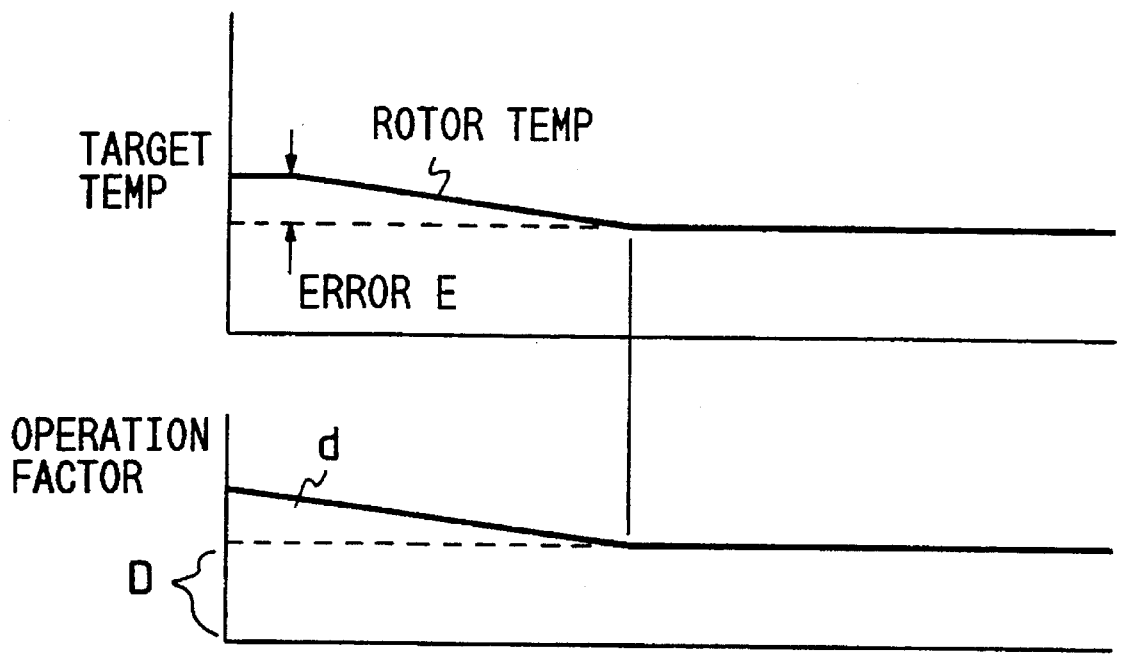
FIG. 7 is a graph which shows a relation between a variation in rotor temperature and an operation factor of a temperature regulating assembly.
Figure 8:
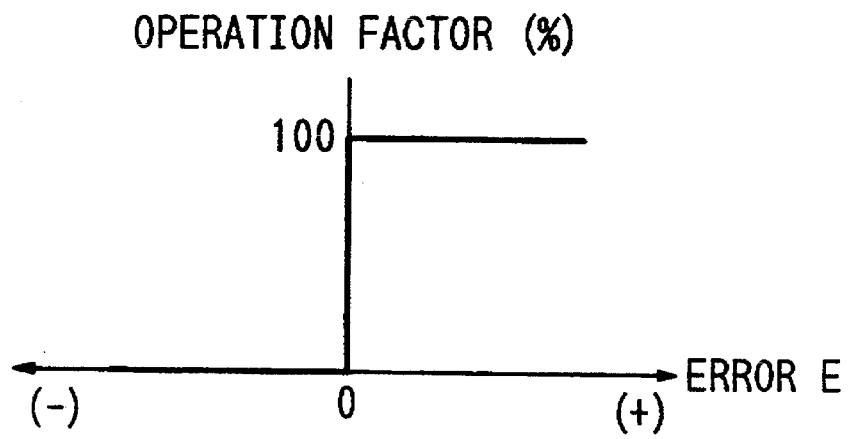
FIG. 8 is a graph which shows a method for determining an operation factor in a conventional ON-OFF temperature control system.
Figure 9:
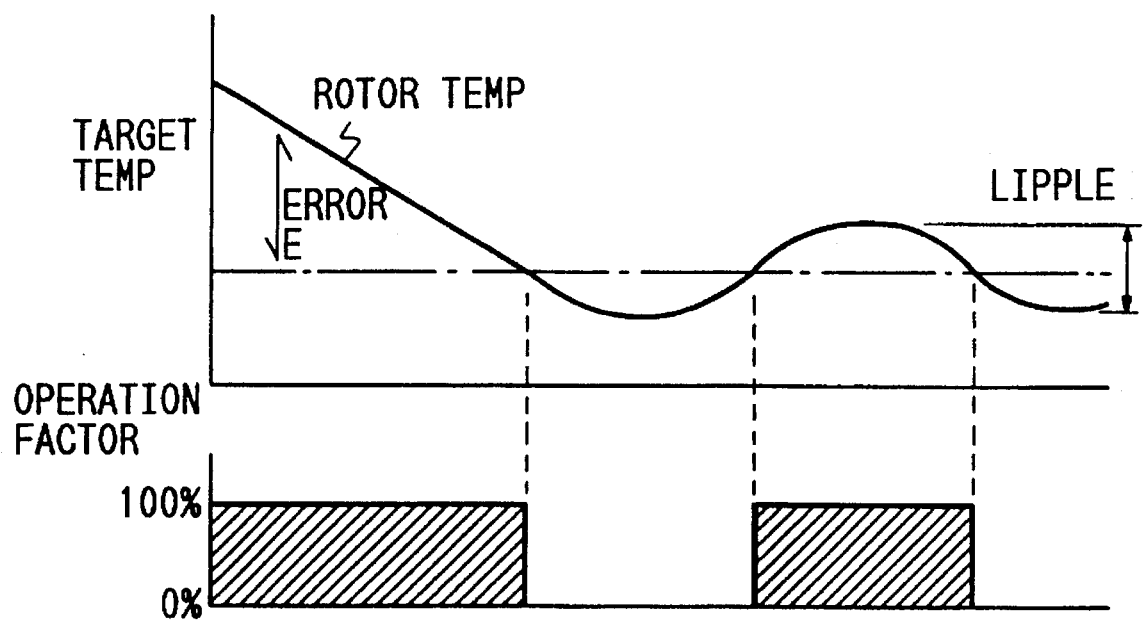
FIG. 9 is a graph which shows a relation between an operation factor and a difference between an actual rotor temperature and a target rotor temperature in the conventional ON-OFF temperature control system, as shown in FIG. 8.
Figure 10:
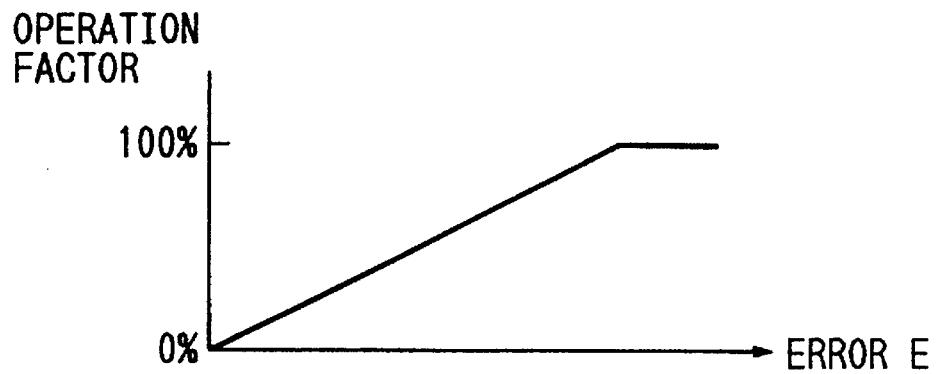
FIG. 10 is a graph which shows a method for determining an operation factor in a conventional P temperature control system.
Figure 11:
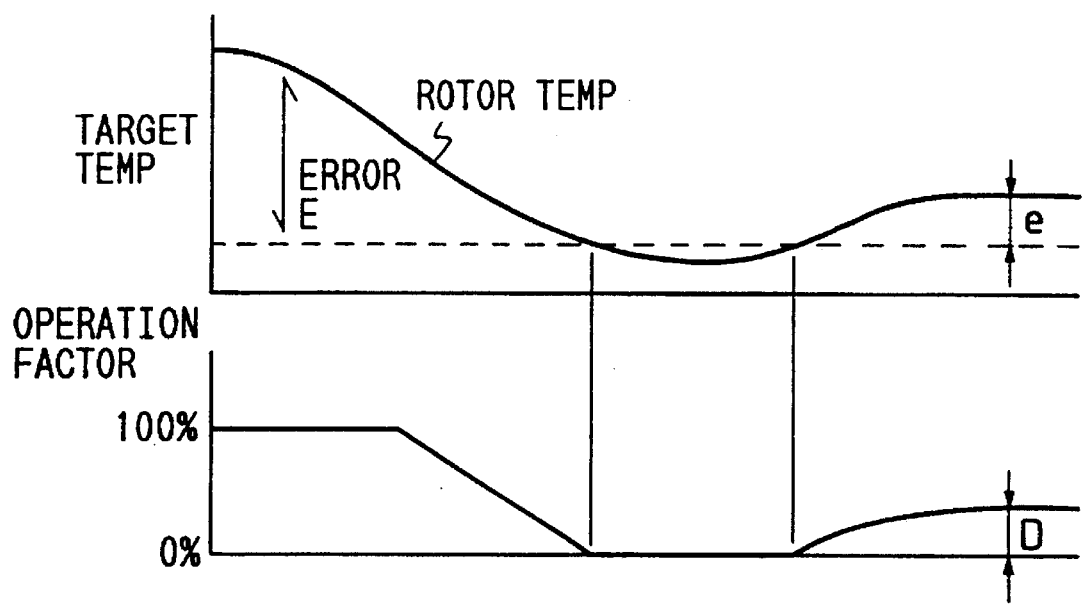
FIG. 11 is a graph which shows a relation between an operation factor and a difference between an actual rotor temperature and a target rotor temperature in the conventional P temperature control system, as shown in FIG. 10.
Figure 12:
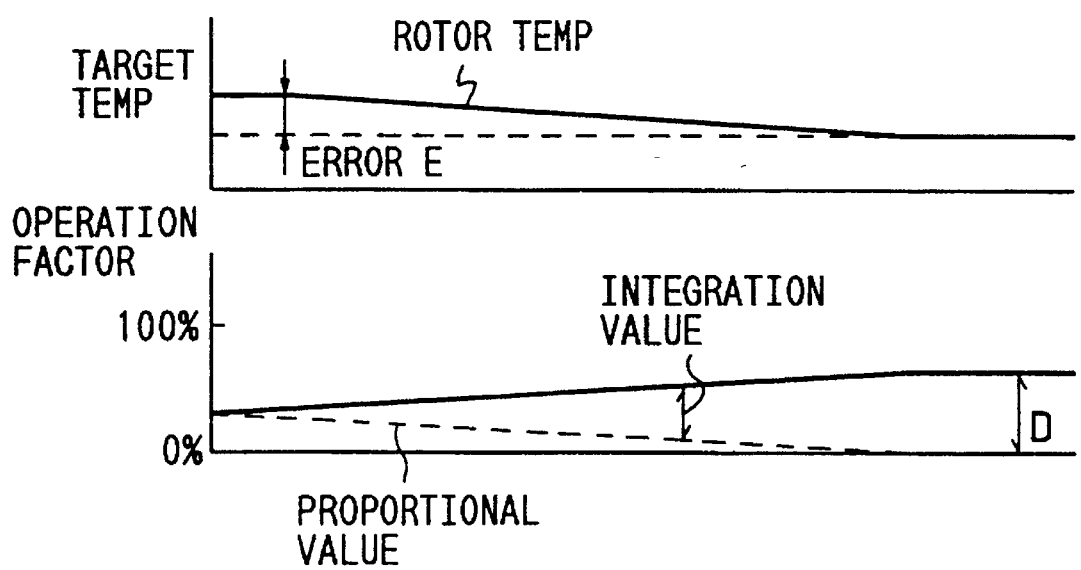
FIG. 12 is a graph which a relation between an operation factor and a difference between an actual rotor temperature and a target rotor temperature in a conventional PI temperature control system.

With the operation factor correction above, when the error between the rotor temperature and the target rotor temperature is greater, the rotor temperature regulating assembly 17 is operated with a relatively great operation factor, while the error is smaller, the rotor temperature regulating assembly 17 is driven with a relatively small operation factor. Therefore, even when the rotor temperature is, as shown in FIG. 7, close to the target rotor temperature as well as when a difference between the rotor temperature and the ambient temperature is great, the rotor 7 is controlled to the target rotor temperature smoothly and quickly.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A rotor temperature control system for a centrifuge comprising:

ambient temperature determining means for determining ambient temperature around the system to provide a signal indicative thereof;

temperature regulating means for regulating temperature of a rotor of the centrifuge according to an operation factor variable within a range of preselected maximum to minimum values; and controlling means, responsive to the signal from said ambient temperature determining means, for controlling the operation factor of said temperature regulating means in a preselected relation to the ambient temperature and a given target rotor temperature to modify the temperature of the rotor to the target rotor temperature, wherein said temperature regulating means includes heat radiating/absorbing means surrounding the rotor and heat-exchanging means operable to transfer heat between ambient air and the heat radiating/absorbing means, said ambient temperature determining means monitoring temperature of the heat-exchanging means to determine the ambient temperature.

2. A rotor temperature control system for a centrifuge comprising:

ambient temperature determining means for determining ambient temperature around the system to provide a signal indicative thereof;

temperature regulating means for regulating temperature of a rotor of the centrifuge according to an operation factor variable within a range of preselected maximum to minimum values; and controlling means, responsive to the signal from said ambient temperature determining means, for controlling the operation factor of said temperature regulating means in a preselected relation to the ambient temperature and a given target rotor temperature to modify the temperature of the rotor to the target rotor temperature further comprising rotor temperature determining means for determining temperature of the rotor and providing a signal indicative thereof, and wherein said controlling means operates said temperature regulating means at the operation factor determined in the preselected relation to the ambient temperature and the given target rotor temperature while monitoring a difference between the rotor temperature determined by said rotor temperature determining means and the target rotor temperature, wherein the rotor temperature determining means includes a radiating temperature sensor which detects radiation heat produced from the rotor, said controlling means determining the rotor temperature based on the radiation heat from the rotor and the ambient temperature determined by said ambient temperature determining means.

3. A rotor temperature controlling method for controlling temperature of a rotor of a centrifuge comprising the steps of:

determining ambient temperature around temperature regulating means for regulating temperature of the rotor according to an operation factor variable within a range of preselected maximum to minimum values;

determining a value of the operation factor of said temperature regulating means in a preselected relation to the ambient temperature and a given target rotor temperature; and providing a control signal to said temperature regulating means to operate said temperature regulating means at the operation factor determined in said operation factor determining step for modifying the temperature of the rotor to the target rotor temperature, wherein said temperature regulating means includes heat radiating/absorbing means surrounding the rotor and heat-exchanging means operable to transfer heat between ambient air and the heat radiating/absorbing means, said ambient temperature determining step monitoring temperature of the heat-exchanging means to determine the ambient temperature.

4. A rotor temperature control system for a centrifuge comprising:

ambient temperature determining means for determining ambient temperature around the system to provide a signal indicative thereof;

temperature regulating means for regulating temperature of a rotor of the centrifuge according to an operation factor variable within a range of preselected maximum to minimum values; and controlling means, responsive to the signal from said ambient temperature determining means, for controlling the operation factor of said temperature regulating means in a preselected relation to the ambient temperature and a given target rotor temperature to modify the temperature of the rotor to the target rotor temperature, wherein, over a predetermined range of values of said operation factor of said temperature regulating means, said controlling means controls said operation factor by providing to said temperature regulating means an operation signal representing a value having a substantially linear relationship to the ambient temperature indicated by the signal from said ambient temperature determining means.

5. A rotor temperature control system as set forth in claim 4 wherein said controlling means controls said operation factor by providing said operation signal to said temperature regulating means with values substantially proportional to a difference between the ambient temperature and said target rotor temperature.

6. A rotor temperature control system as set forth in claim 4 wherein said controlling means controls said operation factor by providing said operation signal to said temperature regulating means with values determined in accordance with the ambient temperature and said target rotor temperature and independently of the temperature of the rotor.

7. A rotor temperature controlling method for controlling temperature of a rotor of a centrifuge comprising the steps of:

determining ambient temperature around temperature regulating means for regulating temperature of the rotor according to an operation factor variable within a range of preselected maximum to minimum values;

determining a value of the operation factor of said temperature regulating means in a preselected relation to the ambient temperature and a given target rotor temperature; and providing a control signal to said temperature regulating means to operate said temperature regulating means at the operation factor determined in said operation factor determining step for modifying the temperature of the rotor to the target rotor temperature, wherein said step of determining a value of the operation factor of said temperature regulating means comprises establishing the value of said operation factor over a predetermined range within said range of preselected maximum to minimum values thereof in a substantially linear relationship to the ambient temperature around said temperature regulating means.

8. A rotor temperature controlling method as set forth in claim 7 wherein said step of establishing said value of said operation factor comprises providing values of said operation factor proportionally to a difference between the ambient temperature and said target rotor temperature.

9. A rotor temperature controlling method as set forth in claim 7 wherein said step of establishing said value of said operation factor comprises providing values of said operation factor in accordance with the ambient temperature and said target rotor temperature and independently of the temperature of the rotor.

\* \* \* \* \*